April 5, 1966 R. W. DOWNING 3,245,057

CURRENT PULSING CIRCUIT

Filed May 15, 1961 2 Sheets-Sheet 1

INVENTOR
R. W. DOWNING
BY
SE Hollander
ATTORNEY

CURRENT PULSING CIRCUIT

Filed May 15, 1961 2 Sheets-Sheet 2

INVENTOR
R. W. DOWNING
BY
S E Hollander
ATTORNEY

United States Patent Office 3,245,057
Patented Apr. 5, 1966

3,245,057
CURRENT PULSING CIRCUIT

Randall W. Downing, Chatham, N.J., assignor to Bell Telephone Laboratories, Incorporated, New York, N.Y., a corporation of New York Filed May 15, 1961, Ser. No. 110,061
12 Claims. (Cl. 340—174)

This invention relates to matrix arrays, and more particularly, to circuits for gaining access thereto.

Information in magnetic memory arrays is most often written and read by coincident current techniques. Row and column conductors are coupled to all of the magnetic elements in the array. The energization of any one of these conductors applies a magnetomotive force to all elements coupled thereto that is no more than approximately one-half of the magnetomotive force necessary to switch the magnetization state of any element. However, the simultaneous energization of a row and a column conductor results in a switching of the magnetization state of the element residing at the intersection of the two conductors. Coincident currents are required to switch the magnetic elements to either one of the two stable magnetization states.

A word organized array consists of magnetic elements arranged so that individual bits represent an entire word of information. For example, an entire row of a toroidal magnetic core matrix may represent the information content of one word, each element being one bit in this word. All bits in an individual word are written simultaneously. To write a word a current is applied to the row conductor that is insufficient to set any of the magnetic cores. Currents are applied to only those column conductors coupled to cores in the row which it is desired to set. These currents, coincidentally applied with the row current, set the respective cores or bits in the word, the other cores coupled to column conductors to which current pulses are not applied remaining in their previous magnetization state.

When it is desired to interrogate the matrix, that is, to read out an entire word, a current pulse is applied to the particular row conductor. This current unlike the write row current is sufficient to switch the magnetization state of all cores in the row. If the write currents set clockwise fluxes in the cores, the read pulse resets them to the counterclockwise direction. Only those cores previously set by the write current pulses switch magnetization states. When these particular cores switch magnetization states they induce voltage pulses in the respective column conductors coupled to them. Sense amplifiers, connected to these column conductors detect these voltages and determine which particular cores in the row were previously set by the coincident write currents.

In recent years many new magnetic memory elements have been developed. Among these is the twistor disclosed in an application of A. H. Bobeck, Serial No. 675,522, now Patent No. 3,083,353, filed August 1, 1957. Numerous advantages are achieved when twistor elements are incorporated in a matrix array. Among these are simplicity of fabrication.

The twistor wires themselves comprise a homogeneous magnetic conductive material or a magnetic material and a conductive material together. A preferred flux path is arranged, this flux path often being a helix along the length of the wire. Flux, when set in the twistor wire, is in a heilcal path along its length. At the same time currents can flow through the wire.

One possible configuration of an array utilizing twistor wires comprises row conductors of ordinary conductive material and vertical twistor wires. At the intersection of each row conductor and any column twistor wire one bit of information can be stored. The row conductors are often copper tapes, the bit of information being represented by the direction of flux along the preferred helical path in the twistor wire at the intersection of the copper tape and twistor. To write a bit of information a current is applied to a particular column twistor wire. This current is in a direction to set the flux along the entire helical path in one direction. However, this current is made insufficient to switch the magnetization of the wire. At the same time a current is applied to a particular copper tape. This current applies a magnetomotive force to a section of all twistor wires adjacent to the tape but is also insufficient for switching the direction of magnetization of the preferred helical flux path in the twistor wires.

The magnetization, however, in that portion of a twistor wire which is adjacent to the tape containing the applied current and through which a column current flows, is switched by these coincident currents. The direction of the flux is determined by the directions of the tape and twistor currents.

In a word organized twistor array when it is desired to write an entire word, a row current is applied to the particular copper tape. Column currents are coincidentally applied to those twistor wires whose intersections with the selected tape form the bit positions into which it is desired to write. When it is desired to read out the word a large current pulse, opposite in polarity to the write pulses, is applied to the row copper tape. This current is sufficient to switch the direction of flux in a section of each twistor wire adjacent to the tape. Those bits previously written reverse magnetization states. These flux reversals induce voltages in the conductive portions of the twistor wires themselves and are detected by sense amplifiers connected to each of the vertical twistor wires.

The previously-described word organized twistor memory contains words stored along the copper tapes. It is possible, however, to store the words along the twistor wires themselves. In this configuration, the twistor wires comprise the row conductors with the copper tapes forming the vertical strips in the grid network. In this configuration when it is desired to write a word along a particular twistor wire a current pulse is applied to the wire. This row write current is insufficient to set the magnetization of the twistor. Currents are selectively and coincidentally applied to the vertical copper tapes to set the fluxes in sections of the twistor wire adjacent to the respective energized vertical conductors.

To read a word out of the array a large read current is applied to a twistor wire. This current is sufficient to set the direction of magnetization throughout the twistor wire in a direction opposite to the direction set during the write operation. Those bits previously set exhibit flux reversals and induce voltages in the vertical copper tapes. Sense amplifiers connected to these tapes detect these voltages and determine the information content of the previously-stored word.

There are numerous advantages in this latter configuration commonly referred to as the inverted twistor array. For example, the attenuation introduced by a copper tape is often less than the attenuation of a twistor wire. The induced pulses during the read operation in the vertical conductors are generally small in magnitude and the smaller the attenuation introduced by the vertical conductors, the less chance of error. It is preferable, therefore, that the vertical conductors should comprise the copper tapes and this is indeed the case in the inverted twistor array.

Similarly, the propagation time down the vertical conductors should be minimum. When the twistor bits reverse flux direction during the read process voltage pulses are induced in the column conductors. These pulses must propagate to the sense amplifiers where they are detected. No further write or read operations may be performed until these pulses reach the sense amplifiers. Thus, the speed of the array is very much a factor of the propagation time along a vertical conductor. Copper tapes are again preferable for the column conductors as they introduce less delay in the propagation of the induced pulses than do the twistor wires themselves.

Although there are many advantages in the inverted twistor array as compared to ordinary twistor arrays and certainly to conventional magnetic core arrays, there is one major shortcoming to them. Similar problems may be encountered in other arrays and the solution to them, the substance of my invention, would be appropriately applicable. The word organized twistor array is operated by coincident currents during the write process. It is necessary that the only bits which are set during the write operation are those represented by the intersections of the particular row twistor wire energized and the selected column copper tapes which are coincidentally pulsed. No other bits along the selected twistor wire should be set and no bits in all of the remaining twistor wires in the array should be set. Ideally, no bits in all of the remaining twistor wires will be set because these bits have applied to them at most half of the magnetomotive force necessary for switching, this resulting from the currents in the column copper tapes.

However, it is possible for certain bits in the remaining twistor wires to be erroneously set, particularly if close tolerances are not maintained in the magnitudes of the vertical currents. The problem is most pronounced where three adjacent column tapes are pulsed simultaneously. This will be the case whenever three adjacent bits are written in the selected twistor wire. In such an event not only will these three bits be set in the selected row conductor but the bits in all of the other twistor wires along the middle one of the three sequential copper tapes may erroneously be set. Suppose the twistor array contains $n$ rows and $m$ columns. Suppose further that it is desired to write three adjacent bits in row $i$ of the array, these bits being coupled to the $j-1$, $j$ and $j+1$ columns. As desired, the $j-1$, $j$ and $j+1$ bits in row $i$ are set. However, it is also possible for all of the bits in column $j$ in the remaining $n-1$ rows to be erroneously set.

This results from the unique interaction between the copper tape fields in the inverted twistor array. Each column conductor current applies a magnetomotive force to not only that section of the twistor wire in close proximity to it but to a considerably lengthier portion of twistor wire, and more specifically to the sections of twistor wire underneath the adjacent column tapes. Thus, in effect the magnetomotive force applied to each bit arises not only from the currents in the twistor and tape conductors comprising the bit but from the currents in the adjacent copper tapes as well, and if the two currents in the $j-1$ and $j+1$ copper tapes together have the same magnetizing effect on the twistor sections between them in each twistor wire that is as strong as the magnetizing force of a row-write current, all of these bits will be erroneously set. The second half of the magnetizing force arises not from the row current but from the interaction of the two adjacent vertical currents.

Because of the magnetizing effect on all bits along a vertical conductor by currents in adjacent tapes, it is seen that if three sequential tapes are pulsed simultaneously, bits in the middle column may be erroneously set. Similarly, if the word being written is to have two bits set, separated by one bit that is to remain unset, the middle bit may be erroneously set. Although the middle tape is not pulsed, the two adjacent currents may produce a sufficient magnetizing force on the middle bit which in coincidence with the row current sets that bit.

This problem is more pronounced in the inverted twistor array than in the ordinary twistor array because when writing a word into the latter, currents are applied simultaneously to the twistor column conductors. These currents have little effect on adjacent twistor wires. It is predominantly in the inverted twistor array where the copper tapes affect substantial lengths of twistor wires that the problem presents itself.

The immediate disadvantage caused by this interaction is that the array must be larger in size. To avoid the interaction between the copper tapes they must be widely separated, that is, the bits along the individual twistor wires must be far removed from one another so that a column current affects only those bits directly underneath it. Needless to say this restriction may seriously increase the size of the array.

It is an object of this invention to provide an improved access circuit for memory matrix arrays and more specifically for an inverted twistor memory array.

It is another object of this invention to reduce the size of such arrays.

It is another object of this invention to reduce the tolerances required for the setting currents in such arrays.

It is still another object of this invention to provide these improvements with a minimum amount of additional circuitry.

In one specific illustrative embodiment of my invention the above objects are achieved by controlling the current in each copper tape in accordance with the currents in the two adjacent tapes. When a current is applied to one vertical conductor, the currents in the two adjacent vertical conductors are reduced. If, in fact, the two adjacent conductors are not pulsed at all, that is, the bits underneath them are not to be set, a reverse current flows in these strips. In this manner, it is seen that if the two outside conductors in any group of three are energized, they both cause a reduced current to flow in the middle conductor if that conductor is pulsed as well, or an oppositely directed current if the middle conductor is not energized. In either case all bits underneath the middle conductor are not set except for the one bit in the selected row if the middle conductor is pulsed.

Were three currents, each producing approximately half of the switching magnetomotive force to be applied to three adjacent copper tapes, as has been stated it would be possible for the middle bits in the remaining twistor wires in the array to be set, the two outside currents having the same effect on the bits along the middle wire as a row current pulse would have. However, in my invention the current in the middle conductor is reduced and is less than half of the switching magnetomotive force. Thus, even if the two adjacent conductors have a half magnetizing effect on the bits along the middle wire, the current in this middle wire does not supply the additional half of the switching magnetomotive force to set the elements.

The middle bit which it is desired to set in the selected row, however, does switch magnetization state even though the middle column conductor does not supply the full half of the switching magnetomotive force that it does in conventional arrays. The additional magnetomotive force required to switch the bit underneath the middle conductor is supplied by the outside adjacent currents. In effect, rather than minimizing an undesirable interaction, it may be said that, in accordance with my invention, the interaction is utilized for setting the bits and is actually necessary for the proper functioning of the array.

In the event that only one of the two adjacent copper tapes is energized, the current in the middle conductor is reduced by only half the amount that it is reduced in the event that both adjacent conductors are pulsed. This is desired for the interaction is only half of what it would be were both conductors energized, and, to insure that the middle bits on the unpulsed twistor conductors are not set, the current in the middle copper tape may be reduced by a lesser amount.

In the event that no current is applied to the middle conductor if the bit in the selected row coupled to it is not to be set and currents are applied to the two adjacent conductors coupled to bits that are to be set, the two adjacent currents cause a reverse current to flow in the middle conductor. This reverse current cancels the setting effect of the two adjacent currents on each of the bits proximate to the middle copper tape. It also cancels the effect of the adjacent currents on the middle bit in the selected row as this bit is not to be set.

Although this relationship exists between the magnitudes of the currents in any three conductors, it is not to be assumed that the copper tapes are divided into distinct groups of three. The current relationships are maintained for any successive group of conductors. It is only necessary for proper operation that each current reduce or cause an oppositely directed current in the two conductors adjacent to it.

The current in each copper tape is controlled not only by its respective pulsing circuit but in addition in accordance with the currents in the two adjacent conductors. The means whereby this control is achieved are load sharing and reverse transformer winding circuits. The $j$ and $j+1$ conductors are coupled together by a common load sharing circuit, this circuit enabling a current in either one of these conductors to cause an oppositely directed current in the other conductor of the pair. The $j+1$ and $j+2$ conductors are each coupled to the other by reverse transformer windings, these windings enabling a current in either one of these conductors to cause an oppositely directed current in the other conductor of the pair. The $j+2$ conductor and the $j+3$ conductors are coupled to each other by a load sharing circuit while the $j+3$ and $j+4$ conductors are coupled together by transformer windings. In this manner the load sharing circuits alternating with the reverse transformer circuits control the current in each conductor in accordance with the currents in the adjacent conductors.

Briefly, the load sharing and transformer circuits affect the currents in adjacent pairs of two conductors in the following manner. The pulsing circuit for each of the column conductors in the illustrative embodiment of this invention described herein consists of a voltage source coupled to the tape by a transformer. This transformer is generally to be found in a twistor array because a large current is required in the column conductors to set the bits. The coupling between the column conductors and the twistor wires is often small, and for proper operation large currents must be supplied and current step-up transformers are thus often necessary. One end of each copper tape is connected to the respective transformer secondary. Each of the other ends of two adjacent conductors are connected to a common load resistor which is, in turn, connected to ground. The voltage drop across each copper tape is, therefore, the difference between the transformer secondary voltage and the voltage across the common resistor. And the voltage across the common resistor is determined by currents in both of the copper tapes. The greater the voltage across the resistor the less is the voltage across each tape as the latter voltage is equal to the difference of the respective transformer secondary voltage and the voltage across the load resistance. A current flowing in one of the tapes in each pair causes the voltage across the common load to increase. And this increase in voltage causes a reduction in the current flowing in the other conductor of the pair and even an oppositely directed current if the latter conductor is not pulsed by its pulsing circuit and there is no voltage across its respective transformer secondary.

The reverse transformer winding circiuts consist mainly of an additional primary winding on each transformer, which winding is coupled to the voltage source connected to the other conductor in each pair of two. This additional winding in each transformer is wound oppositely to the primary of the transformer connected to the pulsing source. Thus, if one conductor of the pair is pulsed by its voltage source and a current flows therein, the same source induces an opposite voltage in the secondary of the transformer connected to the other conductor in the pair. This voltage reduces the current in the other conductor and actually causes a reverse current to flow if the second voltage source connected to the second conductor is not energized.

It is a feature of this invention not only to eliminate unwanted interaction between adjacent conductors in a memory array but to utilize this interaction for proper operation of the array as well.

Another feature of this invention is means for causing a reduced current or an oppositely directed current to flow in each conductor when currents are caused to flow in either one or both of the two adjacent conductors.

A further feature of this invention is means for controlling the current in each conductor in every pair of two conductors in accordance with the current in the other conductor in the same pair.

It is another feature of this invention to provide some of this control by the incorporation of reverse winding transformers.

It is another feature of this invention to provide some of this control by the incorporation of common load sharing circuits.

It is still another feature of this invention for such transformers and load sharing circuits to be connected alternately to successive pairs of two conductors.

A complete understanding of this invention and the various features thereof may be gained from consideration of the following detailed description and the accompanying drawing, in which.

Figure 1:
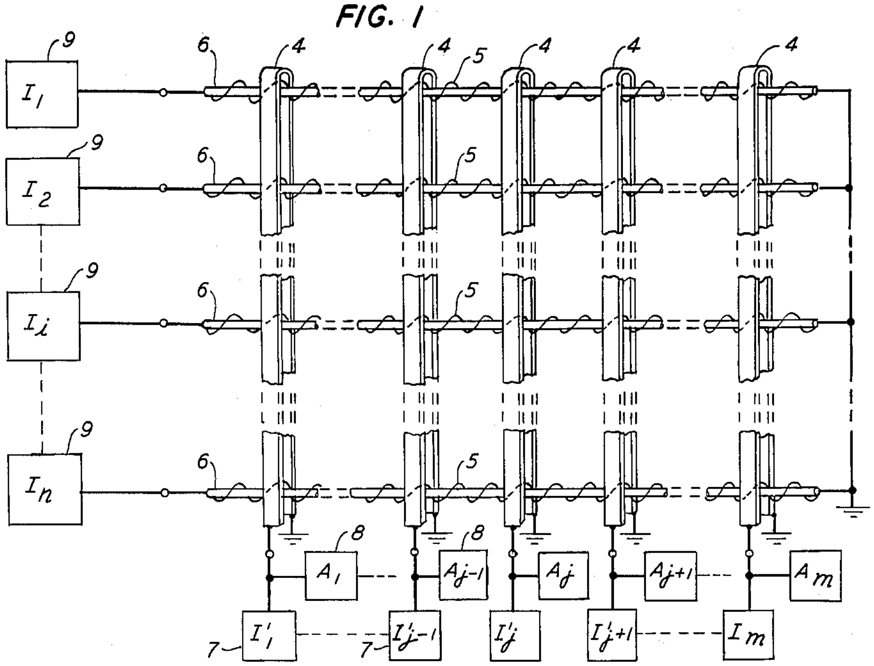
FIG. 1 is a schematic drawing of a conventional inverted twistor array.

Referring now to FIG. 1 individual words are stored along twistor wires 6, each bit being represented by the direction of flux along helical path 5 at the intersection of a twistor wire 6 and a copper tape 4. The preferred flux path 5 is not necessarily of a separate material as shown in the figure and instead the twistor wire may comprise a homogeneous material, as is known in the art.

There are $n$ rows or words stored in the memory at one time, each of these having $m$ bits, one for each column conductor. When it is desired to write a word into the memory in any row $i$, the respective current source 9 applies a negative current pulse to the respective twistor wire 6. This current flowing from ground to the source applies a magnetomotive force to the wire for setting the flux along the helical path 5 in a direction from left to right. This magnetomotive force, however, is insufficient for setting any of the remanent flux in the wire.

At the same time, positive pulses of current are applied by sources 7 to those copper tapes 4 overlaying the bits which it is desired to set. For example, if it is desired to set bit $j$ in row $i$ current source $I_j'$ applies a positive current to copper tape $j$. This current applies a magnetomotive force to the twistor wire at the intersection of row $i$ and column $j$ for setting flux along path 5 in a direction from left to right. This current in itself is also insufficient for setting the flux but in coincidence with the row current writes one bit of information into the twistor wire.

When it is desired to read out a word from row $i$ current source 9 applies a current pulse of oppoiste polarity to the row. This pulse is sufficient in magnitude for resetting the flux along the entire path 5 in a direction from right to left with a consequent flux reversal in all bits previously set by the coincident write currents. These flux reversals during the read operation induce voltages in the respective copper tapes. Sense amplifiers 8, respectively connected to the $m$ column conductors, detect these voltages and determine the bit information of the previously stored word.

The magnetomotive force applied to each twistor wire by the current in each copper tape is not necessarily limited to that small section of path 5 enfolded by tape 4. Instead, the magnetizing force extends along path 5 both to the left and right of each copper tape and affects the magnetization of adjacent bits. Theoretically a very large current applied to only one copper tape would set all bits in the array. It is necessary, therefore, to control the magnitude of the tape currents, the lower limit being determined by the minimum magnetizing force required to set a bit underneath the copper tape in coincidence with the row current, and the upper limit being determined by the maximum current which if exceeded will set adjacent bits as well. The currents must be carefully controlled or in the alternative the copper tapes must be widely separated.

If it is desired, for example, to set bits $j-1$, $j$ and $j+1$ in row $i$ currents are applied to the twistor wire in row $i$ and to the three copper tapes 4. The coincidence of the row current with each one of the column currents sets the bit at the intersection. However, the currents in tapes $j-1$ and $j+1$ both apply magnetizing forces to all bits in column $j$. The remaining $n-1$ bits in column $j$ may erroneously be set if the sum of the magnetizing force applied to each bit along the middle conductor caused by the two outer currents is equal to or greater than the magnetizing force of the row current. For example, bit $j$ in row 2 may be set by the current in column $j$ in coincidence with the magnetizing forces applied to this bit by the currents in columns $j-1$ and $j+1$.

Thus, if three copper tapes in sequence are pulsed, it is possible to erroneously set all bits along the middle tape, not only the bit in the selected row. In my invention the current in the middle column is reduced if the adjacent conductors are pulsed. This is achieved by providing means for causing a reverse current to flow in both conductors adjacent to an energized conductor. This is achieved in the illustrative embodiment of FIG. 2 with the alternation of load sharing impedances 17 and reverse transformer windings 18.

The copper tapes 4 are often pulsed by a transformer circuit. Because large currents are required, a current step-up transformer is incorporated in the pulsing circuit. A voltage source 10 associated with each copper tape is connected across a primary 14. A voltage is induced in secondary 16 which causes a current to flow through the copper tape. The copper tapes are usually connected to ground as shown in FIG. 1, the current magnitude in the tape being, therefore, determined solely by the secondary voltage and the tape impedance.

Figure 2:
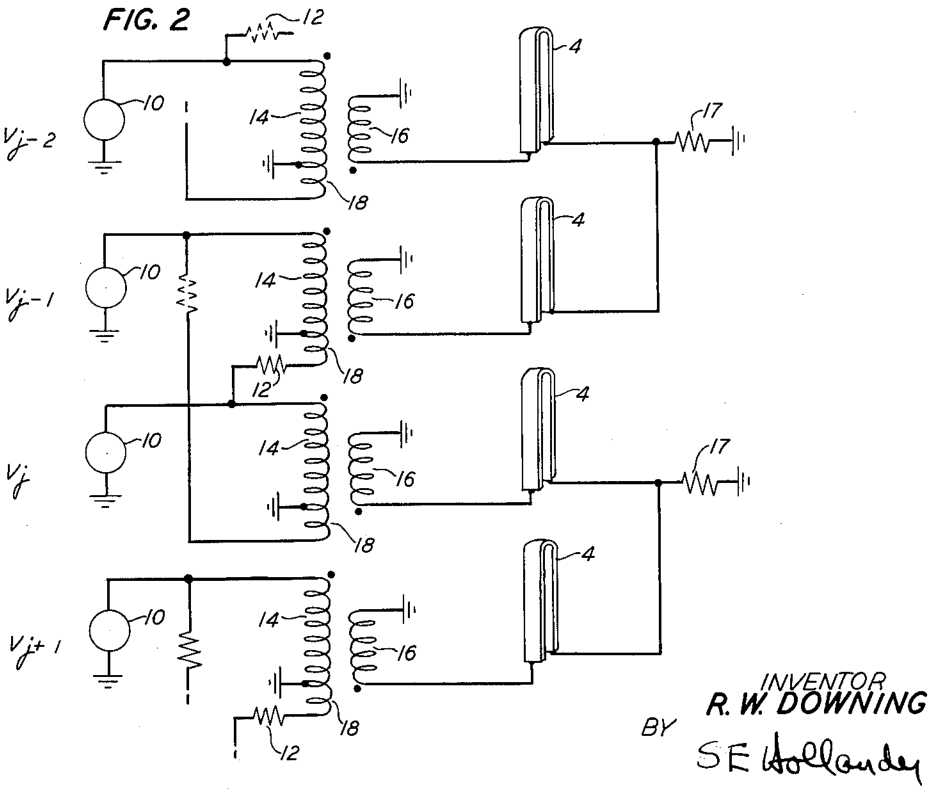
FIG. 2 is an illustrative embodiment of my invention for modifying the access circuits in FIG. 1.

In FIG. 2, however, pairs of two successive copper tapes are connected to individual load sharing resistors 17 rather than to ground. Consider the two copper tapes associated with voltage source $V_{j-2}$ and $V_{j-1}$. The current in each copper tape is no longer determined solely by the voltage on its associated secondary 16. The voltage drop across the tape is less than this voltage and is, in fact, equal to the difference of the secondary voltage and the load voltage. And because the load voltage is determined by the current in the other tape it is seen that a current in either tape cause a reduced current in the other tape of the pair.

Similarly, if only one of the two sources is operated the voltage across the other tape is determined solely by the voltage across the common load. This voltage is in a direction opposite to the voltage on secondary 16 when it is pulsed and, therefore, causes a reverse current to flow in the other copper tape. In this manner it is seen that current in each tape of every pair causes an oppositely directed current to flow in the other tape of the pair.

The currents in the two copper tapes associated with voltage sources $V_{j-1}$ and $V_j$ have a similar effect on each other. The relationship is determined, however, not by a common load but rather by reverse transformer windings. The primary 14 of each transformer has an additional coil 18 which is connected to the other source of the pair. And this winding is in a direction to cause an induced voltage in the secondary of the associated transformer that is opposite in polarity to the voltage of the pulsing source.

Thus, for example, when the copper tape associated with source $V_j$ is pulsed, this source applies a positive voltage through resistor 12 to coil 18 in the previous transformer as well as to its associated coil 14. The voltage applied to coil 18 causes an induced voltage in secondary 16 that is negative in polarity. Thus, if source $V_{j-1}$ is also operated, the total voltage on secondary 16 is less than that obtained were source $V_j$ unoperated. Consequently, the current through the associated tape 4 is reduced as the total secondary voltage is less.

Voltage source $V_{j-1}$ is coupled to the transformer associated with tape $j$ in a manner identical to that in which voltage source $V_j$ is coupled to the transformer associated with tape $j-1$. It is seen that each voltage source thus causes a reduced current to flow in the other tape of the pair. And in the event that only one of the two sources is operated the only voltage applied to the secondary of the other transformer is negative in polarity and causes an opposite polarity current to flow in the associated copper tape.

In a similar manner tapes $j$ and $j+1$ are coupled by a common load 17, tapes $j+1$ and $j+2$ are coupled by reverse transformer windings, etc. The current in each copper tape is thus controlled not only by the associated pulsing circuit but by the currents in each of the two adjacent tapes as well. The current is controlled in accordance with the current in one of the two adjacent tapes by load sharing means, and by the current in the other adjacent tape by reverse transformer winding means.

Figure 3A:
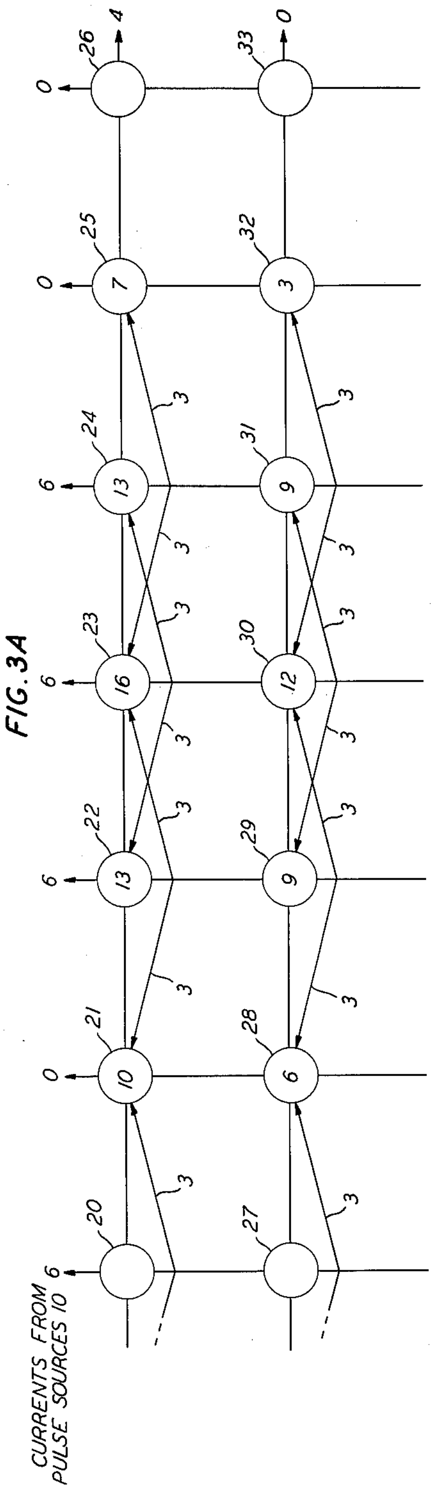
FIGS. 3A and 3B illustrate illustrative relative magnetizing forces both with and without the compensating means of my invention.
Figure 3B:
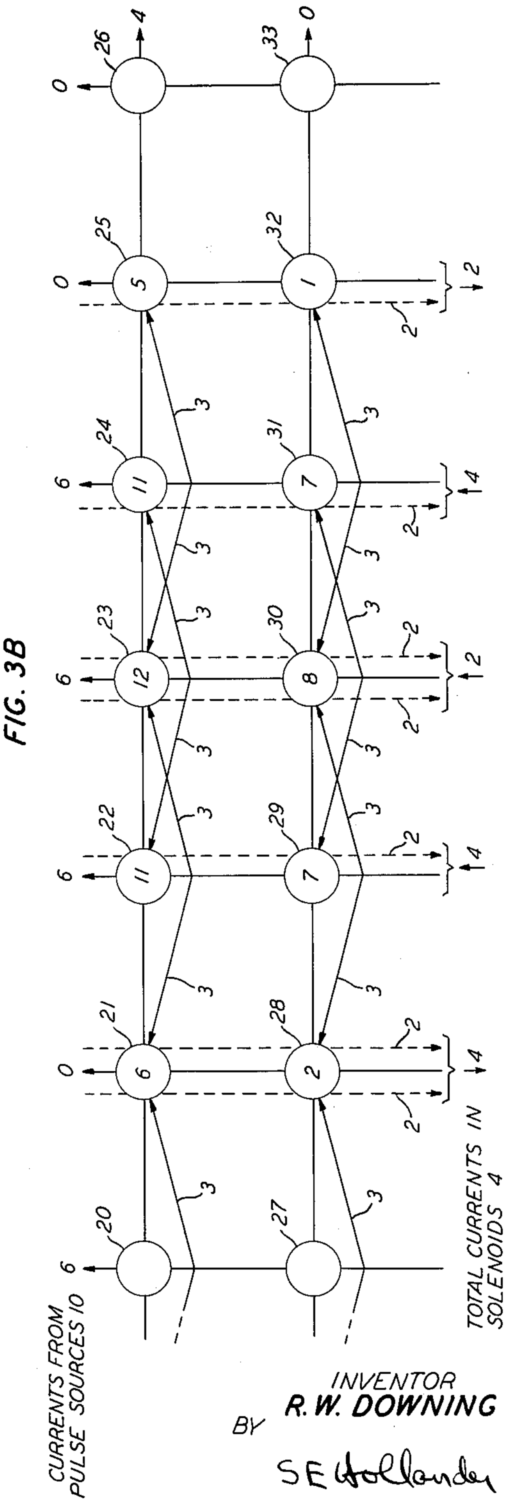

A more complete understanding of the operation of the circuit of FIG. 2 may be gained by consideration of the interactions between the magnetizing forces in a more detailed illustration as shown in FIGS. 3A and 3B.

In FIG. 3A, 14 bits are schematically shown, 7 on each of two rows. These bits are assumed, for this discussion, to require ten magnetizing units to set. In a typical array four of these units may be applied by the row current and six by the column currents. In FIG. 3A a word is being written in the top row, this row having applied to it four magnetizing units. The lower row has applied to it no magnetizing force. Of the seven vertical conductors considered, four of them are pulsed and ideally should apply six magnetizing units to each bit in their respective columns. Thus, in FIG. 3A the only bits which should set under ideal conditions are bits 20, 22, 23 and 24 since these bits are the only ones having ten magnetizing units applied to them. The remaining bits in the top row have only four units, bits 27, 29, 30, and 31 in the lower row having six units, and bits 28, 32, and 33 having no magnetizing forces at all applied to them.

However, the interaction between adjacent bits causes two types of errors. In the array schematically represented by FIG. 3A, each current is also assumed to apply a magnetizing force of three units to each bit in the two adjacent columns. This is symbolically represented by the diagonal arrows connecting each column current to the adjacent bits it affects.

The numbers in the circles representing the individual bits indicate the total number of magnetizing units applied to each bit. No numbers are indicated for cores 20, 26, 27, and 33 as the currents in the adjacent conductors are not shown and thus the total magnetizing force cannot be determined from the information given in the figure. The four selected bits, 20, 22, 23, and 24 set as desired. Bit 22 has applied to it four units of row magnetizing force, six units from its column current and three units from the interaction of the one adjacent energized conductor for a total of 13 units. This exceeds the ten units required for setting and the bit easily switches magnetization state. Similar remarks apply to bit 24.

Bit 23 has both adjacent conductors energized and, therefore, a total of six magnetizing units applied to it from these currents. The total magnetizing force is 16 units as shown. Bit 20 has applied to it at least ten units and possibly another three if the next leftmost conductor, not shown in the figure, is pulsed. In any event, the bit is set.

Bit 25 has applied to it seven magnetizing units and as desired does not set. Similarly, bit 26 has four units, and at most another three if the next rightmost column conductor, not shown in the figure, is pulsed and will not set.

However, bit 21 which should not set as its column is not pulsed erroneously does so. The two adjacent currents supply six magnetizing units to the bit which have the same effect as a vertical current. Bit 21, a middle bit between two pulsed conductors is set. This erroneous setting must be precluded from occurring.

Similarly, the lower row contains bits which may erroneously be set. No row current is applied to these bits and, consequently, all of the magnetizing forces must result from the directly applied column currents and the indirect magnetizing forces from the adjacent column currents. Bit 27 will not set because it has applied to it at most three units depending on whether or not the next leftmost conductor is pulsed. Similar remarks apply to all of the bits except bit 30. The magnetizing forces applied to the bits in the lower row are identical to the forces applied to the bits directly above except for the fact they are four units less. This is a result of the absence of the row magnetizing current. And bit 30 having 12 units applied to it erroneously sets. This is the second type of error, false setting of bits in unselected rows, that must be prevented.

FIG. 3B shows the modified magnetizing forces produced in accordance with an aspect of my invention in the illustrative embodiment of FIG. 2. The dotted arrows represent currents in the direction shown. These currents are controlled by the adjacent pulsing circuits. For example, the leftmost dotted current through bits 23 and 30 is controlled by the pulsing circuit connected to bits 22 and 29. The rightmost current is controlled by the pulsing circuit connected to bits 24 and 31. As seen in this figure, each component of compensating current produces only two units of magnetizing force although the interaction is three units. This is sufficient, however, for insuring satisfactory performance.

The leftmost and rightmost vertical conductors contain no compensating current. The conductors shown in the figure adjacent to them are not energized and, therefore, do not cause opposite polarity currents to flow in these conductors and it is unknown whether or not the other adjacent conductors not shown in the figure are pulsed. Therefore, information concerning the total current in these two conductors or the total magnetizing force applied to each bit they comprise is unknown. However, the magnetizing forces applied to the remaining ten bits in the array afford an understanding of my invention.

The vertical conductor through bits 23 and 30 originally contained six units of current in the upward direction. However, the energization of the two adjacent conductors causes a total of four uints of opposite polarity current to flow. A total of two units in the upward direction remains. Similar remarks apply to the remaining four conductors, the total number of magnetizing units applied to the bits in the columns being shown at the bottom of the figure. For example, the tape comprising bits 24 and 31 originally contained six units of current. As only one adjacent conductor is energized, the one to the left, the total current is reduced by two units and only four units flow as a result. The copper tape coupled to bits 25 and 32 originally had no current. The one adjacent energized tape causes two units of reverse current to flow in this tape as shown.

The total magnetizing force applied to each bit may now be determined by adding the effects of the row magnetizing force, the column magnetizing force, and the two adjacent interacting fields. The total magnetizing force applied to each bit is shown in the circle representing the individual bit. In the top row it is seen that the four desired bits are set. The total current in the leftmost copper tape is six units, or four units if the adjacent copper tape not shown in the figure is pulsed. If it is six units, the bit sets as a total of ten is applied to it. If the adjacent tape is also pulsed the direct magnetizing force applied is only eight units, four from the column and four from the row. But the additional three from the adjacent interacting field makes a total of 11 and the bit it set.

Similarly, bits 22, 23, and 24 are set as more than ten magnetizing units are applied to each of them. The first bit that was erroneously set in FIG. 3A was bit 21. This bit was erroneously set because although no vertical magnetizing force was directly applied six units were indirectly applied by the two adjacent currents. Now, however, the copper tape through this bit contains four units of current in the reverse direction. The total magnetizing force applied, therefore, is the sum of the four units from the row current, the four opposite polarity units from the column current and the six units from the two adjacent interacting fields. This total of six units does not set bit 21, as desired.

In the lower row in FIG. 3A bit 30 was erroneously set. This second type of error resulted from the fact that although only six units were applied directly to the bit, the two adjacent currents supplied an additional three units each for a total of 12. Now, however, the two adjacent pulsing circuits cause a reduction by four units in the copper tape coupled to this bit. Thus, a total of only eight magnetizing units is applied to bit 30 and this bit does not set. No bit in the lower row is set and satisfactory operation is achieved.

Thus, it is seen that in the illustrative embodiment of my invention the erroneous setting of bits in both the selected row and in unselected rows is avoided. The interaction between bits is actually used to advantage. For example, in FIG. 3B bit 24 has applied to it directly only four units of row magnetizing force and four units of column magnetizing force. The additional three units from the current in the copper tape through bits 23 and 30 cause the bit to be set.

It is understood that the embodiment shown is merely exemplary and that various modifications will be apparent to those skilled in the art without departing from the spirit and scope of the present invention.

What is claimed is:

1. A pulsing circuit for an inverted twistor array having a plurality of magnetic and a plurality of nonmagnetic conductors arranged to form a grid network comprising pulsing means individually connected to each of said conductors, and means for controlling the current in each of said nonmagnetic conductors in accordance with the currents in the two adjacent nonmagnetic conductors, said means including transformer means individually connected to pairs of adjacent pulsing means and load sharing means individually connected to pairs of adjacent nonmagnetic conductors.

2. A pulsing circuit for a memory matrix array having a plurality of row and a plurality of column conductors arranged to form a grid network comprising pulsing means selectively connectable to said conductors, and means for controlling the current in each of said column conductors in accordance with the currents in the two adjacent column conductors, said means including transformer means individually connected to pairs of adjacent column conductors and load sharing means individually connected to other pairs of adjacent column conductors.

3. A pulsing circuit for applying currents to a plurality of conductors comprising voltage means individually coupled to each of said conductors, transformer means individually coupled to pairs of adjacent conductors for applying an opposite second polarity voltage to the adjacent conductor in each pair responsive to the application of a first polarity voltage to any one of said conductors to cause an oppositely directed current in said adjacent conductor, and resistance means individually connected to alternate pairs of adjacent conductors for causing a current in each of said conductors that is opposite in polarity to the current in the adjacent conductor connected to the same resistance means.

4. A pulsing circuit for applying currents to a plurality of conductors comprising voltage means individually coupled to each of said conductors, first means individually coupled to pairs of adjacent conductors for applying an opposite second polarity voltage to only the adjacent conductor in each pair responsive to the application of a first polarity voltage to any one of said conductors to cause an oppositely directed current in said adjacent conductor, and second means individually connected to alternate pairs of adjacent conductors for causing a current in each of said conductors that is dependent upon only and opposite in polarity to the current in the adjacent conductor in the same pair.

5. A pulsing circuit for an inverted twistor array having a plurality of magnetic conductors and a plurality of nonmagnetic conductors arranged to form a grid network comprising pulsing means individually connected to each one of said nonmagnetic conductors, first means including transformer winding means individually connected between each one of said pulsing means and a first one of the two nonmagnetic conductors adjacent to the nonmagnetic conductor connected to said one pulsing means for controlling the current in said one adjacent nonmagnetic conductor in accordance with the energization state of said one pulsing means, and second means including resistance means individually connected to each one of said nonmagnetic conductors and to the second one of the two adjacent nonmagnetic conductors for controlling the current in said second nonmagnetic conductor in accordance with the current in said one nonmagnetic conductor.

6. A pulsing circuit for a memory matrix array having a plurality of row conductors and a plurality of column conductors arranged to form a grid network comprising pulsing means individually connected to each one of said column conductors, first means individually connected between each one of said pulsing means and a first one of the two column conductors adjacent to the column conductor connected to said one pulsing means for controlling the current in only said one adjacent column conductor in accordance with the energization state of said one pulsing means, and second means individually connected to each one of said column conductors and to the second one of the two adjacent column conductors for controlling the current in only said second column conductor in accordance with the current in said one column conductor.

7. A pulsing circuit comprising a plurality of conductors, means for applying currents individually to each one of said conductors, first means coupled to pairs of said conductors for controlling the current in each of said conductors in accordance with the current in only the other conductor in the same pair, and second means coupled to pairs of said conductors for controlling the current in each of said conductors in accordance with the current in only the other conductor in the same pair, said first and second means being connected to different pairs of said conductors.

8. An access circuit for a memory matrix array having a plurality of access conductors comprising a plurality of pulsing sources, a plurality of first means individually connecting selected ones of said pulsing sources, and a plurality of second means individually connecting selected ones of said access conductors, said first and second means controlling the current in each of said access conductors in accordance with the currents in only the two adjacent ones of said access conductors.

9. In combination, a plurality of conductor means arranged in ordered array and a pulsing circuit for applying current pulses to said conductor means, said pulsing circuit comprising energizing means individually connected to each of said conductor means and means for controlling the current in each of said conductor means in accordance with the currents in only the two adjacent conductor means.

10. The combination set forth in claim 9 wherein said controlling means comprises first means responsive to one pair of two adjacent conductor means and second means responsive to a different pair of two adjacent conductor means.

11. An access circuit for a memory matrix array having a plurality of access conductors comprising a plurality of voltage sources, a plurality of transformers having primary and secondary windings, each of said transformers being associated with a respective one of said access conductors, each of said primary windings connected to an individual one of said voltage sources, each of said secondary windings connected to the respective one of said access conductors, a plurality of third windings individually coupling each of said voltage sources to the transformer associated with one of the adjacent access conductors, and a plurality of impedance means connecting each of said access conductors to the other adjacent one of said access conductors.

12. An access circuit for a memory matrix array having a plurality of access conductors comprising a plurality of pulsing sources connected to respective ones of said access conductors, and distinct first means individually connecting adjacent ones of said pulsing sources and distinct second means individually connecting alternate adjacent ones of said access conductors for controlling the current in each of said access conductors in accordance with the currents in the two adjacent ones of said access conductors.

References Cited by the Examiner

UNITED STATES PATENTS

| | | | |
|---|---|---|---|
| 2,947,977 | 8/1960 | Bloch | 340—174 |
| 3,149,313 | 9/1964 | Merz | 340—174 |

BERNARD KONICK, *Primary Examiner.*

IRVING L. SRAGOW, R. J. McCLOSKEY, M. S. GITTES, *Examiners.*